United States Patent [19]

Takahashi et al.

[11] 3,944,278

[45] Mar. 16, 1976

[54] AUTOMOBILE DOOR AND DOOR PILLAR ASSEMBLY PREVENTING DETACHMENT OF DOOR DURING COLLISION

[75] Inventors: Kunihiro Takahashi, Fujisawa; Norimoto Aya, Yokosuka; Kenji Osaka, Chigasaki; Mithuru Furuta, Yokosuka, all of Japan

[73] Assignee: Nissan Motor Company Limited, Yokohama, Japan

[22] Filed: Mar. 11, 1974

[21] Appl. No.: 450,164

[30] Foreign Application Priority Data
- Mar. 12, 1973  Japan................................ 48-27988
- Mar. 12, 1973  Japan................................ 48-27989
- Mar. 12, 1973  Japan................................ 48-27990

[52] U.S. Cl. ............................... 296/146; 296/28 R
[51] Int. Cl.² ............................................... B60J 5/00
[58] Field of Search ................ 296/146, 35 B, 28 R; 292/DIG. 39, DIG. 40, DIG. 41; 52/730, 731

[56] References Cited
UNITED STATES PATENTS

| | | | |
|---|---|---|---|
| 2,116,305 | 5/1938 | Devereaux | 292/DIG. 39 |
| 2,326,789 | 8/1943 | Marine | 296/146 X |
| 2,680,645 | 6/1954 | Brill | 296/28 R |
| 2,860,911 | 11/1958 | Cotter | 296/146 X |
| 3,132,891 | 5/1964 | Pyuro et al. | 296/28 R |
| 3,724,153 | 4/1973 | Wessells et al. | 296/28 R X |
| 3,779,595 | 12/1973 | Suzuki et al. | 296/28 R |
| 3,829,149 | 8/1974 | Stevens | 296/28 R |

FOREIGN PATENTS OR APPLICATIONS

| | | | |
|---|---|---|---|
| 398,465 | 9/1933 | United Kingdom | 296/28 R |

*Primary Examiner*—Robert J. Spar
*Assistant Examiner*—Donald W. Underwood

[57] ABSTRACT

Protuberances formed along mutually confronting end faces of an automobile door and a pillar of a body engage with each other or with the confronting end face when the door collides with the pillar during a vehicle collision. The profile of the protuberance has an apex of an acute angle. The effect of the protuberance may be enhanced by installation of reinforcing members inside the pillar and/or the door.

9 Claims, 12 Drawing Figures

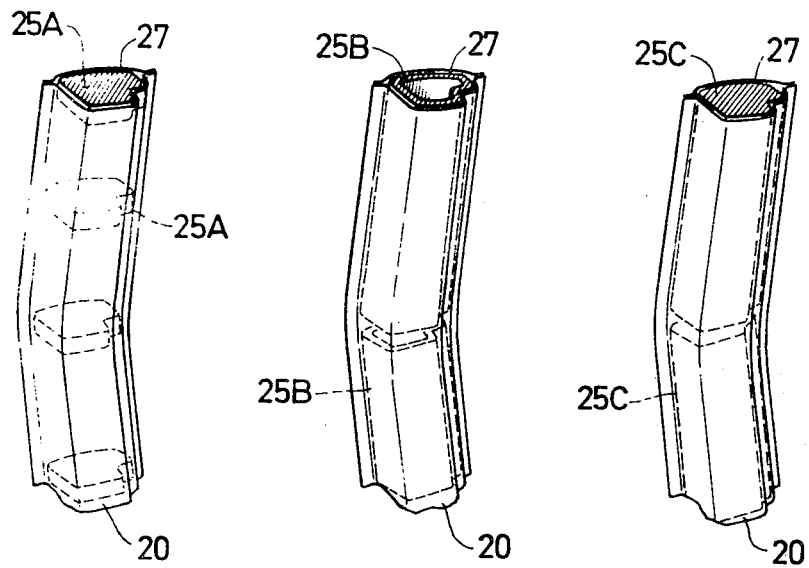
FIG. 10
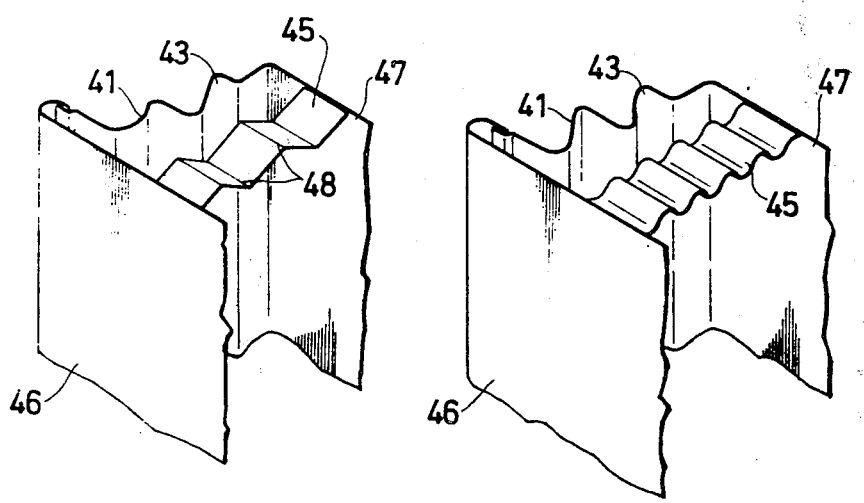
FIG. 11
FIG. 12

AUTOMOBILE DOOR AND DOOR PILLAR ASSEMBLY PREVENTING DETACHMENT OF DOOR DURING COLLISION

The present invention relates to an assembly of an automobile door and a pillar of the body which prevents the door in a closed state from being detached from the body during a collision.

Automobile doors, especially in passenger cars, serve as structural members when assembled with the car body besides their primary function. When a passenger car encounters a head-on collision, a large impulsive force imposed on the vehicle front end is transmitted to every part of the car body, so that the entire body is in danger of being deformed or crushed. The doors are expected to resist the imposed force to protect the passenger compartment from crushing which would be fatal to the passengers, and can meet this expectation fairly well so far as they remain closed. As an unfortunate matter of fact, automobile doors of conventional configuration are easily detached from the body laterally outward provided door hinges are broken by collision forces, causing in many cases severe injuries to the passengers accompanying demolition of the body.

It is therefore an object of the present invention to provide an improved door and door pillar assembly for an automobile which prevents detachment of closed doors from the vehicle body laterally outward when a large impulsive force in a direction parallel to the longitudinal axis of the vehicle due to a collision is exerted on the assembly.

There is provided according to the invention the improvement comprising; at least one protuberance formed along at least one of mutually confronting end faces of a door and a pillar, the protuberance having a profile generally defining an apex and two sides, the two sides being formed at an acute angle, and the protuberance being arranged in such a manner that the protuberance is engaged with the confronting end face when the door is forced to collide with the pillar by a longitudinal impulsive force during collision of the automobile.

The protuberances are formed either by bending a portion of the mutually confronting end faces or by attaching ribs or plates onto the end faces. In addition to provision of the protuberance, the interior space of the pillar may be filled with a reinforcing member leaving a portion of the space confronting the protuberance of the door in order to ensure the catching of the door. Furthermore, unwanted deformation of the precisely formed door end face may be prevented by fixing suitable reinforcing plates within the interior space of the door at locations close to the end face.

Features and advantages of the invention will become apparent from the following detailed description of preferred embodiments referring to the accompanying drawings, in which:

FIG. 10 is a partial perspective view of pillars provided with the reinforcing members of FIG. 9; and FIGS. 11 and 12 are schematic partial perspective views of the door of FIG. 1, showing reinforcing plates provided within the door.

Figure 1:
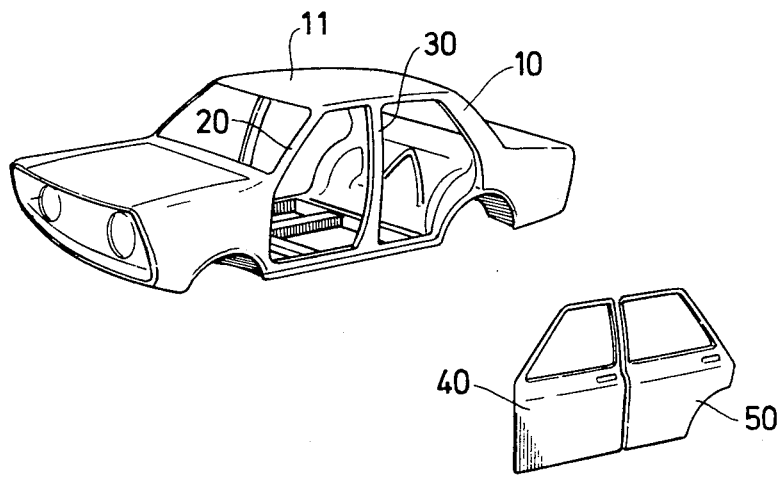
FIG. 1 is a perspective view of a body of a passenger car and doors to be assembled with the body.

In a typical automobile body 10 of a four-door passenger-car, a front pillar 20 and a center pillar 30 are provided on each side to serve as supporting members for a roof 11, and to mount a front door 40 and a rear door 50, respectively, by means of door hinges (not shown). The description presented hereinafter together with the succeeding figures is limited to the assembly of the left front pillar 20 and front door 40, but the invention can be applied to the assembly of the center pillar 30 and rear door 50 as well as the corresponding assemblies on the right side of the body 10.

Figure 2:
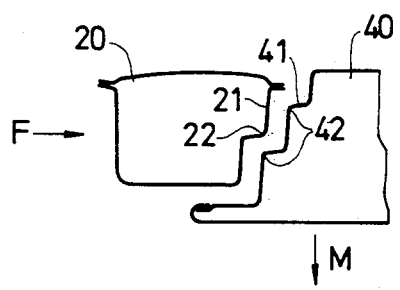
FIG. 2 is a schematic horizontal sectional view of a pillar of the body of FIG. 1 and an end face of the door confronting the pillar when the door is assembled with the body and closed, showing a prior art configuration of the pillar and the door end faces.

Referring now to FIG. 2, which shows a prior art configuration, the rear end face 21 of the front pillar 20 and the front end face 41 of the front door 40 are of stepped shape to enable smooth opening and closing of the door 40. Corners 22 and 42 of these bent end faces 21, 41 respectively are formed at right angle or at obtuse angle to suit the door function. In case that door hinges or hinge pins for a pillar-door assembly of this configuration are broken by a large longitudinal impulsive force (indicated by an arrow F in FIG. 2) caused by, for example, a head-on collision of the vehicle, the door 40 is easily detached from the body 10 and thrown out laterally (in the direction of an arrow M in FIG. 1).

Figure 3:
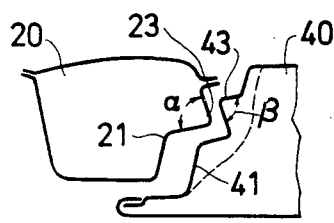
FIG. 3 is similar to FIG. 2, showing a protuberance formed according to the invention.
Figure 4:
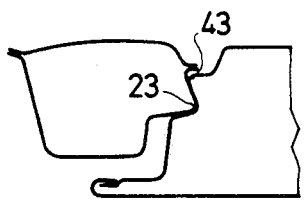
FIG. 4 is the same section as FIG. 3, showing a state after the door is forced to move by an impulsive force.
Figure 5:
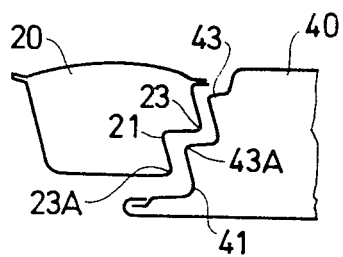
FIGS. 5, 6 and 7 are similar to FIGS. 3 and 4, showing other types of protuberances formed according to the invention.
Figure 6:
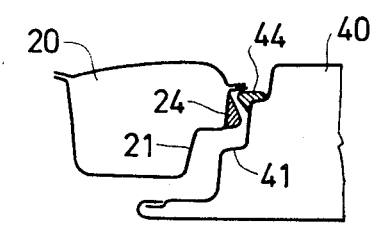

The essential conception of the present invention lies in a novel configuration of the above mentioned mutually confronting end faces 21 and 41. In an embodiment of the invention shown in FIG. 3, the pillar end face 21 and the door end face 41 are formed with protuberances 23 and 43, respectively. Each protuberance 23, 43 is a vertical ridge protruding toward the confronting end face 43, 23, and generally defining an apex and two sides. The sides are formed at acute angles $\alpha$ and $\beta$, respectively. The protuberances 23, 43 are located so that a side of the door protuberance 43 may encounter a side of the pillar protuberence 23 when the door 40 is moved toward the pillar 20 by a force in the direction of the arrow F. The protuberances 23, 43 are arranged so as not to interfere with normal opening and closing of the door 40. If an impulsive force in the direction F causes the door hinges to be destructed, the door 40 moves initially toward the pillar 20, and the protuberances 43 and 23 engage with each other as shown in FIG. 4. Thus, the door 40 is caught by the pillar 20 and prevented from moving laterally. The number and locations of the protuberances 23, 43 are not limited to the illustration of FIG. 3, but pluralities of protuberances may be formed on each of the pillar and door end faces 21, 41 as exemplified in FIG. 5, in which the end faces 21, 41 have two protuberances 23, 23A and 43, 43A, respectively. In the next embodiment shown in FIG. 6, the protuberances are made by forming separately and attaching rib-like members 24, 44 made of a rigid material such as steel and having a similar profile to the protuberances 23, 43 to the end faces 21 and 41, respectively. This arrangement is convenient from the fabrication viewpoint because complex press-forming works can be eliminated. The protuberances of the invention, either press-formed or attached, are usually provided along the entire vertical length of the mutually confronting end faces of the pillar 20 and door 40, but the object may be accomplished by forming protuberances of shorter length at selected locations on the pillar and door end faces 21, 41 taking into consideration the distribution of impulsive force in the body 10 during a collision.

Provision of the protuberance on only the pillar end face 21 or door end face 41 is also effective in attaining the object of the invention if the shape, size and location of the protuberance are properly determined in accordance with the configuration of the other end face. In this aspect of the protuberance formation, prevention of lateral movement of the door 40 is accomplished by deformation of one end face engaging with the protuberance.

Figure 7:
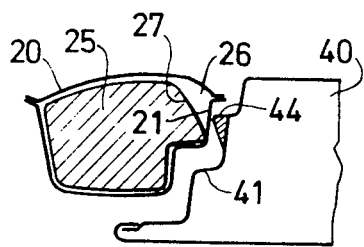
Figure 8:
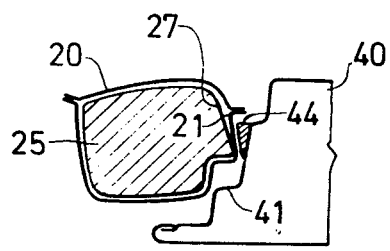
FIG. 8 is similar to FIG. 7, showing a state similar to FIG. 4.

When the door end face 41 alone has the protuberance 43, appropriate deformation of the pillar end face 21 can be accomplished by embedding a filling or reinforcing member having a suitable profile within the pillar 20. In a further embodiment shown in FIG. 7,, a reinforcing member 25, whose profile is nearly similar to that of the pillar 20, is disposed within the interior space of the pillar 20 in such a manner that a portion of the space 26 is left unfilled at a region close to the passenger compartment and the door 40. On the confronting end face 41 of the door 40, the protuberance 44 is formed at the location corresponding to the retained space 26. When the door 40 comes into collision with the pillar 20 as shown in FIG. 8, the pillar end face 21 is dented to an extent predetermined by the shape of the reinforcing member 25, so that the protuberance 44 engages with the dented pillar end face 21, and the door 40 can be effectively prevented from lateral movement. Thus, the pillar end face 21 of this embodiment may be regarded, during a collision, as having a protuberance similar to the afore-illustrated embodiments.

Figure 9:
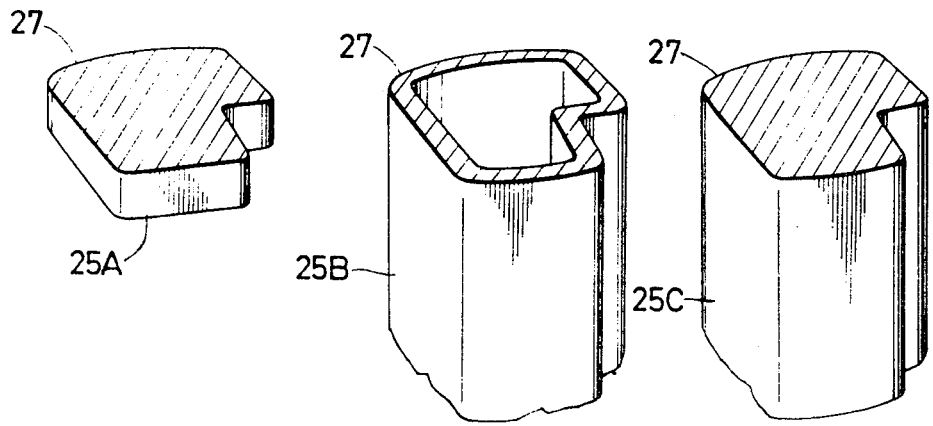
FIG. 9 is a perspective view of reinforcing members for the pillar shown in FIG. 7.

The reinforcing member 25 is made of a material of sufficient rigidity, and may be made in various forms as long as the profile is formed with a cut edge 27 to provide a space 26 corresponding to the location of the protuberance 44 on the door end face 41. FIG. 9 shows three forms of the reinforcing member 25, namely, a plate type 25A, a hollow prism type 25B and a solid prism type 25C. FIG. 10 illustrates the installation of these types of reinforcing members 25A, 25B and 25C in the pillar 20. The plate type 25A may vary in thickness, and a plurality of members 25A may be assembled within the pillar 20 either in contact with or spaced from each other at locations selected taking into consideration both the local strength of the pillar 20 and the arrangement of the protuberance 44 on the door end face 41. A spaced arrangement of the reinforcing members 25A minimizes the weight increase of the body 10. The hollow prism type 25B also features light weight. A member 25B of this type can be divided into some sections for provision the pillar 20, as seen from FIG. 10, to further decrease the weight by avoiding installation at unnecessary regions and to facilitate insertion into a bent pillar 20. The solid prism type 25C is the most reliable in accomplishing the aforementioned catching of the door 40, accompanied with negligible deformation of the pillar 20 at unwanted locations.

It will be apprent that the door end face 41 employed in combination with the reinforcing member 25 may be provided with a protuberance of either the illustrated rib-attached type 44 or the press-formed type 43.

Considering the prevention of the door 40 detachment from the body 10 after the door 40 is forced to come into collision with the pillar 20, crushing of the door end face 41 is undesirable. However, the end face 41 of a conventional door 40 is not an extremely strong member because it is a part of a relatively thin panel. When the imposed impulsive force is considerably large, the door end face 41 may be crushed as shown in dotted line in FIG. 3. Such crushing means loss of the protuberance 43, and the door 40 can no longer be expected to be held by the pillar 20.

To prevent such crushing, still another embodiment of the invention shown in FIG. 11 includes a reinforcing plate 45 fixed within the door 40. The plate 45 is made of a high strength material such as steel and bent at several locations to provide a zig-zag profile in order to increase its rigidity. A plurality of reinforcing plates 45 are assembled, close to the end face 41, in the space between an outer door panel 46 and an inner panel 47 at locations selected so as not to interfere with the normal opening and closing of the window pane. The selected locations for attachment of the plates 45 preferably include those subjected to the largest impulsive force when the body 10 encounters a collision. Each plate 45 is fixed to the inner surfaces of the door panels 46, 47 at its both ends by means of, for example, welding in such an arrangement that edges 48 of the plate 45 formed by bending are parallel to the door panels 46, 47, or to the longitudinal axis of the body 10. The reinforcing plate 45 may be corrugated as shown in FIG. 12 instead of bent to form sharp edges 48 in FIG. 11. It will be understood that the reinforcing plates 45 may be employed in conjunction with each of the described embodiments including those having the reinforcing member 25 for the pillar 20.

As seen from the above detailed description, the object of preventing outward detachment of an automobile door 40 from the body 10 during a vehicle collision can be accomplished by the novel configuration of the pillar end face 21 and the confronting door end face 41 involving employment of the reinforcing member 25 and reinforcing plates 45 for the pillar 20 and door end face 41, respectively. An arrangement according to the invention further features simplicity of fabrication, and hence ease of industrial application.

What is claimed is:

1. In an assembly of an automobile door and a hollow pillar which hingedly holds the door, the improvement comprising at least one protuberance of a generally vertical ridge shape formed on an edge face of said door opposite an end face of said pillar, the cross-sectional profile of said protuberance defining an apex and two sides, said two sides making an acute angle at said apex, and at least one rigid reinforcing member attached to said pillar, said protuberance and said reinforcing member being shaped and arranged in such a correlated manner that said protuberance is apart from said reinforcing member in the closed door state and that said protuberance comes into engagement with said end face of said pillar in confirmance with the cross-sectional profile of said reinforcing member when said door in the closed state is forced to collide with said pillar by an impulsive force in the longitudinal direction of the door in a collision of the automobile, so that said door is prevented from being laterally detached from said pillar, wherein said reinforcing member is disposed in the interior space of said pillar, and the cross-sectional profile of said reinforcing member is generally similar to the cross-sectional profile of said pillar in the same horizontal plane over a major portion of the periphery thereof and locally differentiated such that a portion of said space at a region opposite said protuberance is left unfilled with said reinforcing member, said protuberance and said reinforcing member being shaped and arranged in such a correlated manner that said protuberance dents said end face of said pillar at a region defining the unfilled space in accordance with the differentiated profile of said reinforcing member and engages with the dented region when said door in the closed state is forced to collide with said pillar.

2. The improvement of claim 1, wherein said protuberance is formed by bending a portion of said end face.

3. The improvement of claim 1, wherein said protuberance is formed separately from said end face and subsequently attached thereto.

4. The improvement of claim 1, wherein said reinforcing member is in the form of a plate.

5. The improvement of claim 1, wherein said reinforcing member is in the form of a hollow prism.

6. The improvement of claim 1, wherein said reinforcing member is in the form of a solid prism.

7. The improvement of claim 1, further comprising at least one reinforcing plate fixed within said door at locations close to said end face thereof to prevent unwanted deformation of said end face.

8. The improvement of claim 7, wherein said reinforcing plate has a zig-zag profile, bent edges thereof being arranged in the direction nearly vertical to said end face.

9. The improvement of claim 7, wherein said reinforcing plate has a corrugated profile, corrugations thereof being arranged in the direction nearly vertical to said end face.

* * * * *